(12) United States Patent
Meade et al.

(10) Patent No.: US 9,246,734 B1
(45) Date of Patent: Jan. 26, 2016

(54) METHOD AND APPARATUS FOR SAMPLE FREQUENCY OFFSET CORRECTION OFDM AND SINGLE CARRIER FREQUENCY DOMAIN EQUALIZED RECEIVER SYSTEMS

(71) Applicant: QUALCOMM TECHNOLOGIES INTERNATIONAL, LTD., Cambridge (GB)

(72) Inventors: Steven Anthony Meade, Bristol (GB); Swaroop Venkatesh, San Ramon, CA (US)

(73) Assignee: Qualcomm Technologies International, Ltd., Cambridge (GB)

( * ) Notice: Subject to any disclaimer, the term of this patent is extended or adjusted under 35 U.S.C. 154(b) by 0 days.

(21) Appl. No.: 14/633,475

(22) Filed: Feb. 27, 2015

(51) Int. Cl.
*H04L 27/06* (2006.01)
*H04L 27/26* (2006.01)

(52) U.S. Cl.
CPC ........ *H04L 27/2672* (2013.01); *H04L 27/2657* (2013.01)

(58) Field of Classification Search
USPC ......... 375/260, 316, 324, 326, 340, 346, 348, 375/350
See application file for complete search history.

(56) References Cited

U.S. PATENT DOCUMENTS

| | | | | |
|---|---|---|---|---|
| 6,546,056 | B1* | 4/2003 | Rosenlof | 375/260 |
| 7,369,626 | B1* | 5/2008 | Chiodini et al. | 375/316 |
| 2006/0039507 | A1* | 2/2006 | Lee | 375/326 |
| 2006/0039515 | A1* | 2/2006 | Lee et al. | 375/355 |
| 2010/0322326 | A1* | 12/2010 | Arambepola et al. | 375/260 |
| 2012/0257897 | A1* | 10/2012 | Hu et al. | 398/76 |

OTHER PUBLICATIONS

J.H. Stott, "The Effects of Frequency Errors in OFDM", Research and Development Report, BBC Resources, BBC RD 1995/15, 17 pages.

* cited by examiner

*Primary Examiner* — Khanh C Tran
(74) *Attorney, Agent, or Firm* — Mahamedi Paradice LLP

(57) ABSTRACT

Methods and apparatuses of the invention are directed to correcting errors caused by frequency offsets between clocks in a communication system, for example SFO. According to certain aspects, embodiments of the invention provide for resampling data samples corresponding to a received data symbol immediately prior to performing an FFT. According to certain additional aspects, the resampler operates only on the data samples of a cyclic data block, with a known (and minimized) sample timing error to correct.

18 Claims, 6 Drawing Sheets

METHOD AND APPARATUS FOR SAMPLE FREQUENCY OFFSET CORRECTION OFDM AND SINGLE CARRIER FREQUENCY DOMAIN EQUALIZED RECEIVER SYSTEMS

FIELD OF THE INVENTION

The present invention relates to wireless communications, and more particularly to a simplified resampler for OFDM and single carrier frequency domain equalized receiver systems.

BACKGROUND OF THE RELATED ART

In a wireless communications system such as an orthogonal frequency domain multiplexing (OFDM) communications system, the reference clock in the receiver will not in general be common to that of the transmitter. As a consequence, in a sampled system, the transmitter digital-to-analog converter (DAC) sample rate and the receiver analog-to-digital converter (ADC) sample rate will both have arbitrary sampling phase and period. Any error in the reference clocks used to derive the sampling frequency in either or both of the transmitter and receiver will introduce an offset in the sampling frequency at the receiver, which is referred to herein as Sample Frequency Offset (SFO).

With a relatively narrow-band system, or with a low order fast Fourier transform (FFT), the effect of SFO during the block of data (e.g. an OFDM symbol) presented to the FFT is typically not problematic. A drift in sampling time will be apparent and can be corrected post FFT as a phase slope across output FFT bins (i.e. sub-carriers or tones). This drift can be tracked and corrected post FFT during continued reception. This only corrects the SFO on the total sample drift over, for example, an OFDM symbol period (including Guard Interval).

Meanwhile, the present inventors have recognized that when a higher order FFT (for example ≥256 bins) is utilized, and/or higher order modulation schemes are introduced (for example 256QAM), a secondary source of inter-carrier interference (ICI) post FFT becomes increasingly significant. This can be viewed in a number of ways but most simply the sampling point in the receiver is continually drifting compared to that in the transmitter. This drift (or changing phase slope post FFT) will result in an increasing (with distance in frequency from DC) effective subcarrier frequency offset, which further results in a non-flat noise floor post FFT due to ICI.

Conventionally, a possible approach to address such problems in a digital receiver would be to incorporate a resampler in the system before the boundaries of the data block are known. This approach requires a complex design in order to accurately interpolate over all sample timing errors. All sample phases have to be corrected during continued reception. This approach also causes significant issues with feeding back the estimated SFO which may not be known when the data samples are processed by the resampler.

Alternatively, the SFO induced ICI can be ignored. However, this is only a viable option for receivers with low order FFTs, relatively low maximum SFO and lower order modulation (and for example no MIMO). Designing a system which utilizes the latter approach for narrow bandwidth modes of operation and a continuous resampler for wider bandwidth modes is neither desirable nor an efficient use of hardware resources.

As another possible alternative, the sample clock itself can be controlled. However, this approach inherently introduces the complexity of feedback to the analog domain, delay (and uncertainty when it is applied) in the correction and issues with accuracy of control.

Accordingly, there is a need in the art for solutions to these and other problems.

SUMMARY OF THE INVENTION

Methods and apparatuses of the invention are directed to correcting errors caused by frequency offsets between clocks in a communication system, for example SFO. According to certain aspects, embodiments of the invention provide for resampling data samples corresponding to a received data symbol immediately prior to performing an FFT. According to certain additional aspects, the resampler operates only on the data samples of a cyclic data block, with a known (and minimized) sample timing error to correct.

In accordance with these and other aspects, an apparatus according to embodiments of the invention includes an analog-to-digital converter that produces samples of a wireless signal, a resampler that adjusts the samples in accordance with a sampling time drift, and an FFT that transforms the adjusted samples to a frequency domain representation of the wireless signal.

BRIEF DESCRIPTION OF THE DRAWINGS

These and other aspects and features of the present invention will become apparent to those ordinarily skilled in the art upon review of the following description of specific embodiments of the invention in conjunction with the accompanying figures, wherein.

DETAILED DESCRIPTION OF THE PREFERRED EMBODIMENTS

The present invention will now be described in detail with reference to the drawings, which are provided as illustrative examples of the invention so as to enable those skilled in the art to practice the invention. Notably, the figures and examples below are not meant to limit the scope of the present invention to a single embodiment, but other embodiments are possible by way of interchange of some or all of the described or illustrated elements. Moreover, where certain elements of the present invention can be partially or fully implemented using known components, only those portions of such known components that are necessary for an understanding of the present invention will be described, and detailed descriptions of other portions of such known components will be omitted so as not to obscure the invention. Embodiments described as being implemented in software should not be limited thereto, but can include embodiments implemented in hardware, or combinations of software and hardware, and vice-versa, as will be apparent to those skilled in the art, unless otherwise specified herein. In the present specification, an embodiment showing a singular component should not be considered limiting; rather, the invention is intended to encompass other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the known components referred to herein by way of illustration.

According to certain aspects, the present invention relates to addressing issues in connection with SFO in a wireless communication system such as an OFDM or single carrier frequency domain equalized receiver systems.

Figure 1:
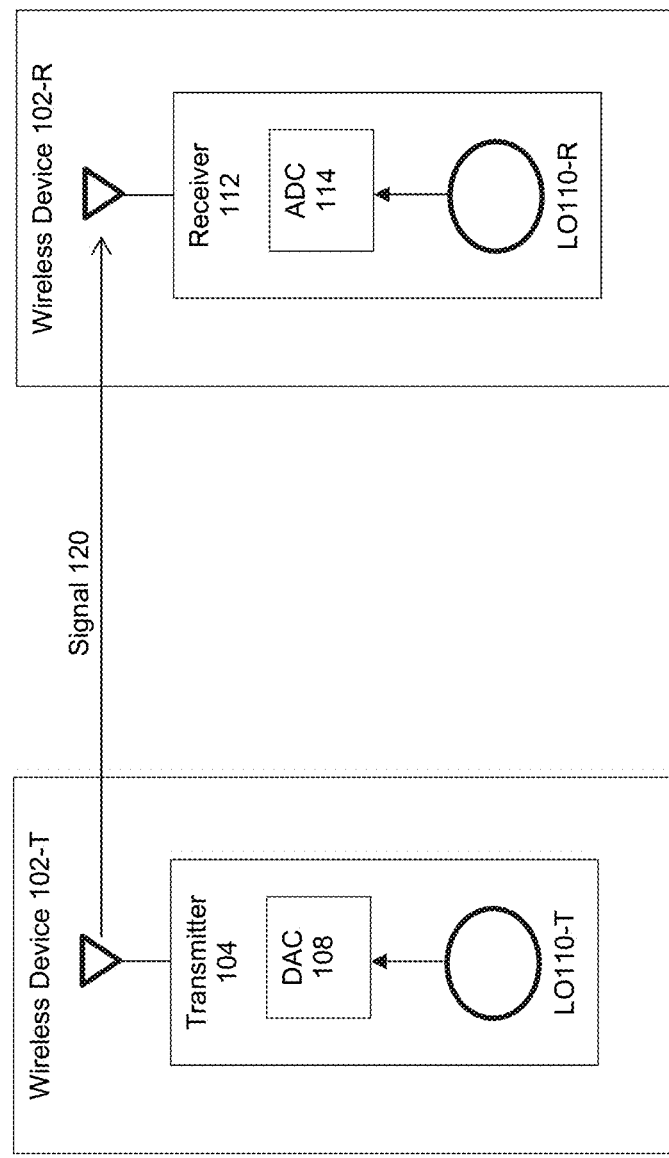
FIG. 1 is a block diagram illustrating an example wireless communications system.

To assist in an understanding of aspects of the invention, FIG. 1 is a block diagram illustrating an example wireless communication system in which embodiments of the invention may be useful.

As shown in FIG. 1, system 100 includes a wireless device 102-T having a transmitter 104 and a wireless device 102-R having a receiver 112. It should be apparent that wireless devices in accordance with the invention can typically have both transmitters and receivers, but only one of each is shown in respective devices 102-T and 102-R for illustrating aspects of the invention. Transmitter 104 and receiver 112 operate to communicate using a common wireless communication protocol such as IEEE 802.11 (i.e. WiFi or WLAN).

In a WiFi example, wireless devices 102 can be incorporated in standalone devices such as access points or routers. Or wireless devices 102 can be incorporated in portable or other devices including other communications or computing functionality, such as smart phones, desktop, laptop or tablet computers, multimedia devices such as televisions, BluRay DVD players, content streaming devices and wireless audio headsets, and Wi-Fi-enabled home appliances and electronics, etc.

In embodiments, wireless devices 102 can be implemented by one or more chipsets, such as WiFi chipsets provided by CSR Technology of Cambridge, UK. Those skilled in the art will understand how to adapt such chipsets for use in the present invention after being taught by the following examples.

As further shown in FIG. 1, transmitter 104 includes a clock 110-T driving the sample rate of the DAC 108 and receiver 112 includes a clock 110-R for driving the sampling rate of the ADC 114. Ideally, these rates should be the same and in phase. However, they typically are not, which leads to the SFO ICI problem described above.

In particular, the present inventors recognize that in an OFDM system, the signal 120 from transmitter 104 received at the receiver 112, $Y_m$, for the at the subcarrier, m, due to SFO ICI is:

$$Y_m = \sum_{-\frac{N}{2}}^{\frac{N}{2}-1} R_k e^{j(\epsilon k - m)\pi} \mathrm{sinc}(\epsilon k - m) \quad (1)$$

Where $R_k$ is the received signal in the subcarrier, k, and $\epsilon = \omega_s/\omega_s'$ is the sampling frequency error as a ratio of the transmitted and received sampling frequencies.

With for example, a 50 ppm sampling frequency error of:

$$\epsilon = \omega_s/\omega_s' = 1/(1+50\times 10^{-6})$$

and 256QAM modulation of 512 subcarriers, Equation (1) can be used to calculate the theoretical Error Vector Magnitude (EVM). The results illustrate the problem to be solved and are shown in FIG. 2.

Figure 2:
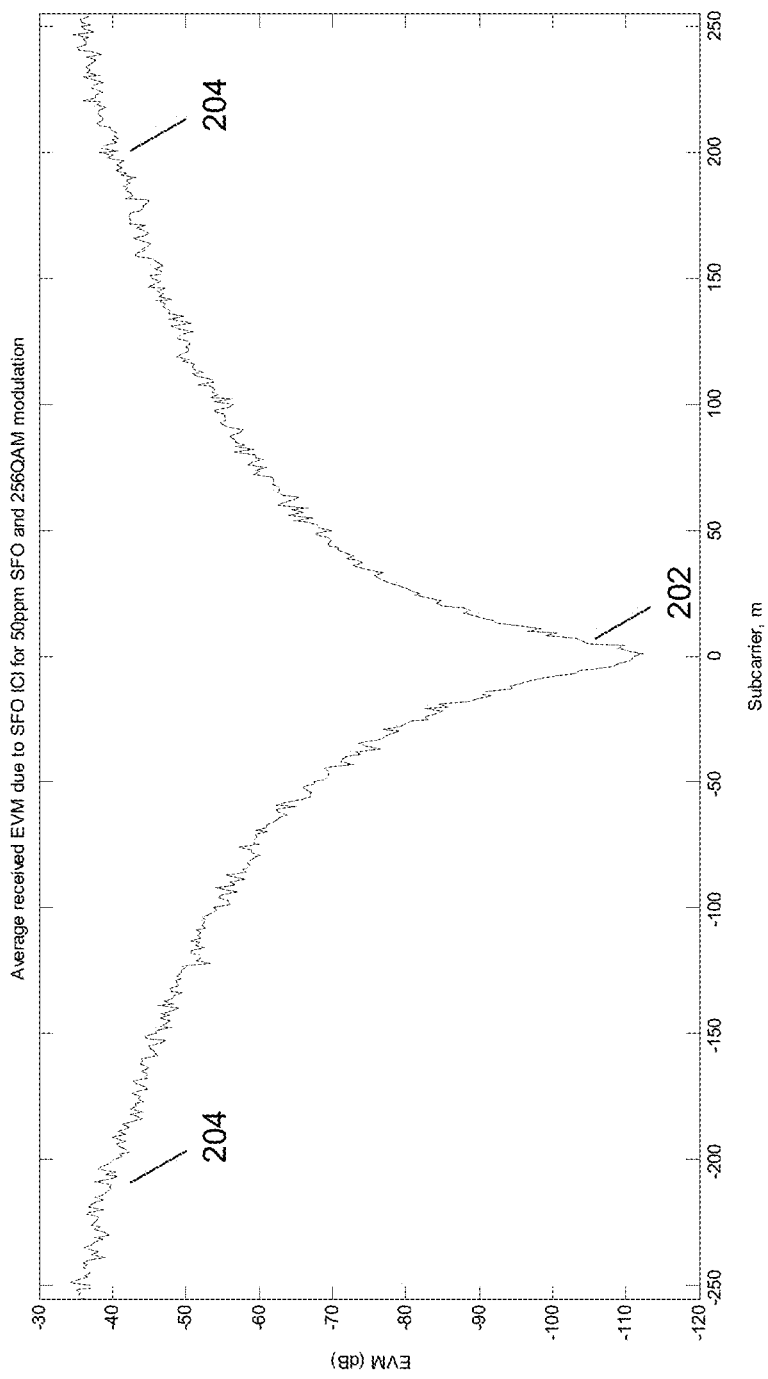
FIG. 2 is a graph illustrating theoretical EVM due to SFO ICI.

As can be seen in FIG. 2, the values 202 of EVM at and around the center subcarrier are insignificant and less than −110 dB. However, the values 204 of EVM increase greatly at the extreme high and low subcarriers up to greater than −40 dB. For example, for a 20 MHz (subcarrier indices from −32 to 31) or a 40 MHz WLAN system (−64 to 63), the EVM values are still low enough to allow the reception of 256QAM modulation. However, for 80 MHz (subcarrier indices from −128 to 127) or 160 MHz (−256 to 255) WLAN system, the higher EVM values, especially on the outermost subcarriers make supporting reception of 256QAM modulation extremely challenging. As such, this increase and non-flat, post FFT effective 'noise floor' can limit the receiver performance, especially as the modulation order is increased. Add in techniques such as MIMO and this SFO ICI impairment can cause a significant non-reducible floor in the Bit Error Rate (BER).

It should be noted that, transmitter 104 and receiver 110 both include clocks to drive a carrier frequency. The differences between the carrier frequency rates used in transmitter 104 and receiver 110 can lead to carrier frequency offset (CFO) issues similar to the SFO issues which are the focus of the present invention. The clocks for driving the carrier frequency and sampling frequency in transmitter 104 and/or receiver 110 can either be common in terms of reference clocks or be independent. Whether common local oscillator and sample clock references or separate, the invention can still be applied.

Figure 3:
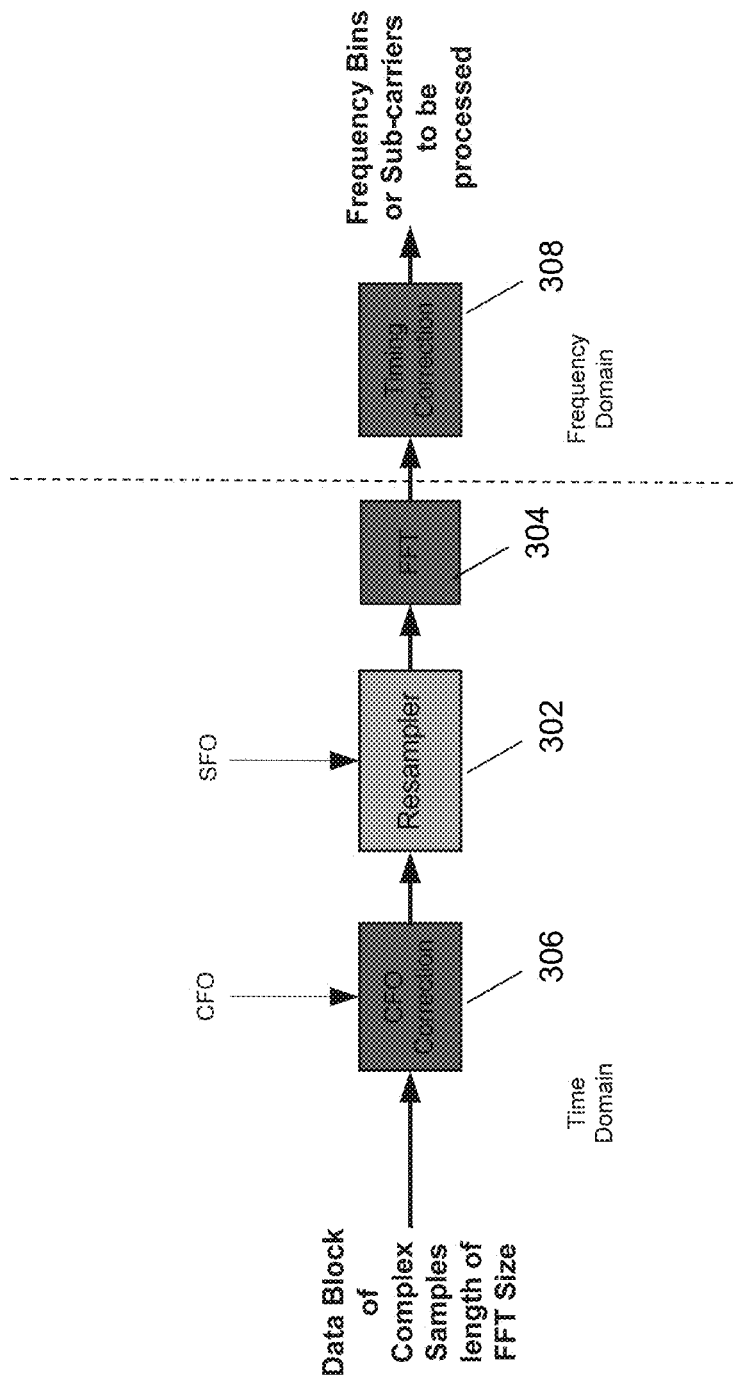
FIG. 3 is a block diagram of an architecture for correcting for clock offsets in a receiver according to embodiments of the invention.

FIG. 3 is a block diagram illustrating an example architecture for correcting transmitter/receiver clock offsets in a receiver according to embodiments of the invention.

According to certain aspects, a receiver architecture 300 (i.e. portion of a receiver chain) according to embodiments of the invention includes a resampler 302 in the processing chain immediately prior to FFT 304, hence able to operate only on the cyclic data block, with a known (and minimized) sample timing error to correct. By only correcting the sample timing drift during the data block, a series of hardware simplifications can be used, to reduce hardware complexity and maintain (or even improve) accuracy. The range of the sample timing error is limited to a small fraction of the sample period.

As further shown in the example of FIG. 3, related CFO is corrected by correction block 306 in the processing chain before resampler 302, hence minimizing the Inter-Carrier-Interference (ICI) due to CFO post an FFT. Likewise, after FFT 304, additional timing correction can be performed in the frequency domain by block 308. This can include a phase rotation on each subcarrier that is proportional to the estimated SFO and the subcarrier index.

Figure 4:
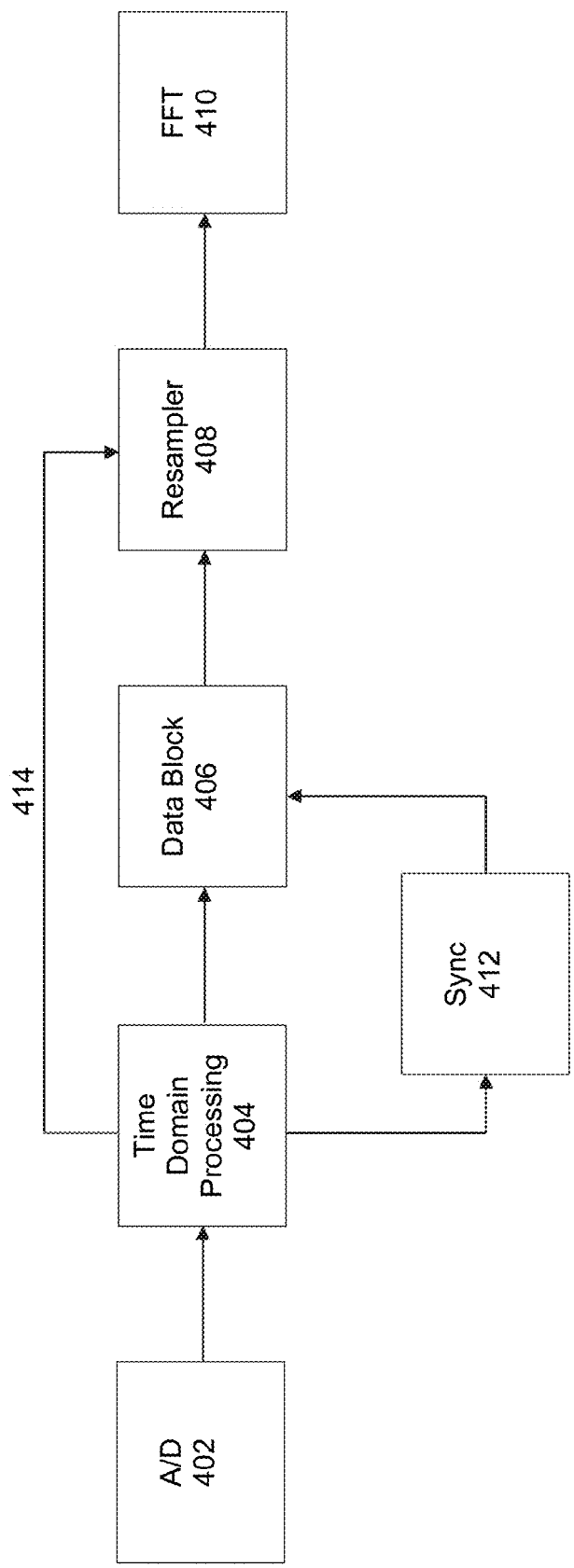
FIG. 4 is a block diagram of an example implementation of an SFO correction architecture in a receiver of an IEEE 802.11 wireless communications system according to the invention.

An example implementation of an SFO correction scheme in a receiver according to embodiments of the invention is shown in FIG. 4. This example implementation is in connection with a wireless communication system such as IEEE 802.11. However, the invention is not limited to such systems, and those skilled in the art will appreciate how to implement the invention in other wireless communication systems after being taught by the present examples.

As shown, digital samples of a received signal are produced by A/D 402 at a sampling rate determined by a local clock (not shown). The samples go through some time domain processing in block 404. This processing can include an estimate of the sampling time drift 414, which is used to assist in SFO correction by resampler 408, as described in more detail below. The processing in block 404 can also include CFO correction. Synchronization block 412 communicates with block 404 to identify only the samples associated with one OFDM symbol and capture them in data block 406. For example, processing block 404 and synchronization block 412 can cooperate to prevent data samples from preamble portions of a received signal, such as the STF and LLTF fields of a data frame, to populate data block 406, while using those data samples to perform processing such as estimating sample drift. Moreover, processing block 404 and synchronization block 412 can operate to strip off non-data bits of a data symbol such as cyclic prefix bits. As should be apparent, the number of samples stored in data block 406 correspond to the number of taps in FFT 410. In a 512 OFDM subcarrier example, data block 406 contains 512 complex data samples.

Resampler 408 according to embodiments of the invention thus operates solely on the block 406 of time domain complex samples at the input to the FFT 410. No state is stored between operation of the resampler 408 from one FFT input block (e.g. OFDM symbol) to a subsequent FFT input block. There is no requirement to resample over a longer period than during, for example, the 512 samples of an OFDM symbol input to be fed into the subsequent FFT stage. It has only to correct the timing drift during the OFDM symbol as estimated by value 414.

Figure 5:
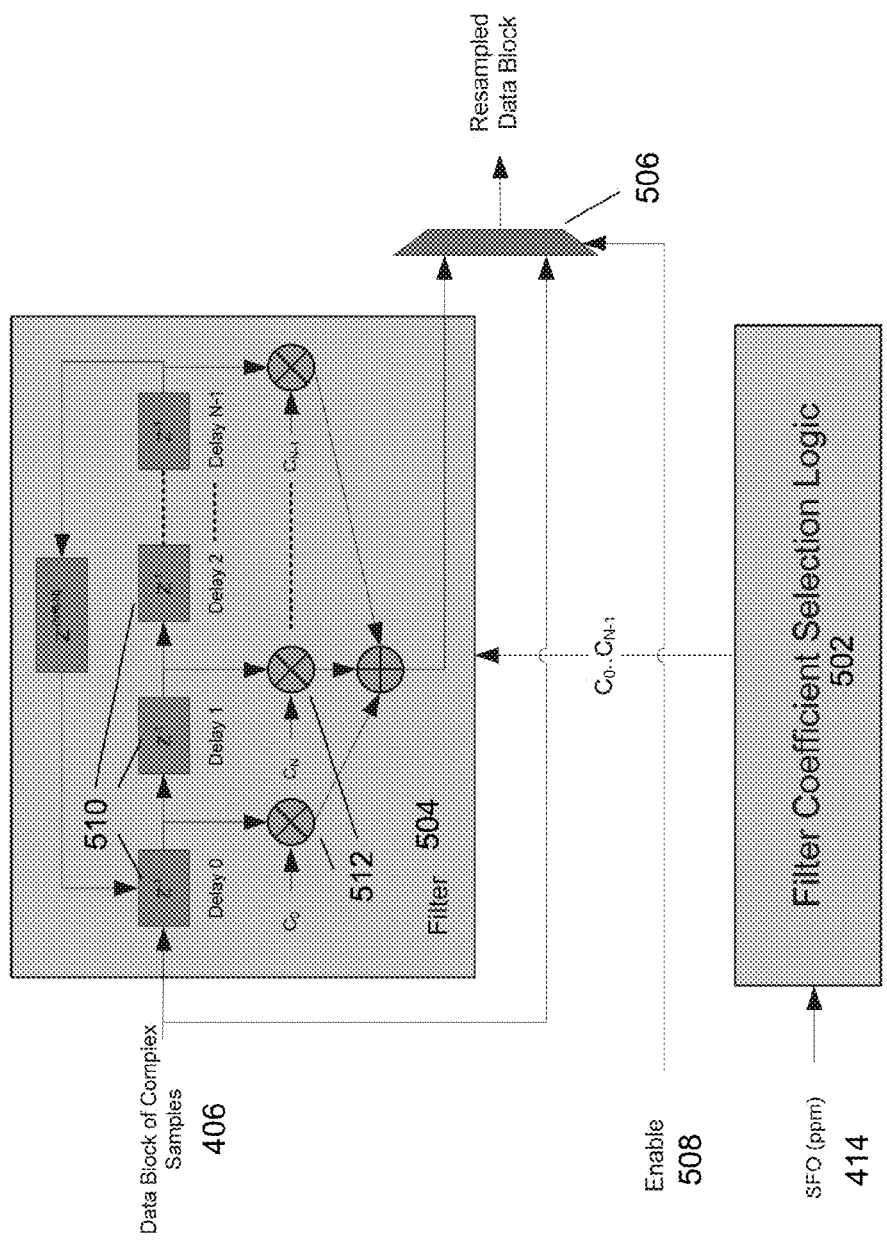
FIG. 5 is a block diagram of an example resampler according to embodiments of the invention.

FIG. 5 is a block diagram representing an example resampler 408 according to embodiments of the invention.

The data block 406 is assumed to be cyclic in nature (which is true for OFDM systems and can be created for SC-FDE systems). The reference time is reset to the start of each block of data (e.g. an OFDM symbol in a WLAN receiver). The sampling time error is accumulated over each sample of the data block. The accumulated sampling time drift 414 is used by coefficient selection logic 502 to select a set of pre-calculated filter coefficients to correct fixed sample time errors. In one example embodiment, resampler 408 can include a plurality of sets of coefficients (e.g. in a lookup table, not shown), with each respective set optimized for a different value of sampling time drift. In this embodiment, logic 502 uses the received sampling time drift 414 to find the set of coefficients for the closest matching value of sampling time drift for which coefficients are stored.

As shown, the coefficients are provided to multipliers 512 in filter 504, which is implemented by an N-tap FIR filter. The order N of the filter 504 and the number of sets of filter coefficients can be pre-computed and optimized for the particular system, to cover the required accuracy (and residual error) and the maximum sample drift to be corrected. The latter is a function of the number of samples in the data block and the maximum SFO to be corrected. With, for example, a maximum 50 ppm SFO error and a 512 sample Data Block 406, the range of sample timing error to correct will be from 0 to $512*50e^{-6}$ of a sample period, and so N* maximum SFO <half the sampling phase of the first set of filter coefficients. It should be noted that the first set of coefficients used do not need to 'resample' to a fractional sampling phase (as at the start of each OFDM symbols block of data the sampling reference phase is reset back to zero). Uniquely among the set of coefficients utilized, the coefficients are symmetrical. The simplest embodiment would be, for example for a 7-tap filter, having coefficients 0,0,0,1,0,0,0 for the first set, but in reality the design of the filter is slightly more complex. i.e. they are derived from a high order filter split into multiple polyphases, hence will include a frequency dependent characteristic.

The filter 504 operates over the samples in the cyclic Data Block 406. Note that, in operation, the first N samples from block 406 are not resampled but are used to load the N delay taps 510 of the filter 504, and enable signal 508 causes mux 506 to pass these initial N samples directly to FFT 410. This allows a further simplification of the design by removing the need for buffering of the total data block 406 before processing. The delay blocks 510 for cyclic operation only need to store the initial samples equivalent to the group delay of filter 504. After loading the first N samples, the remaining T−N samples (T=the total number of complex samples in block 406, for example 512) are resampled by filter 504 using the coefficients provided by logic 502.

Figure 6:
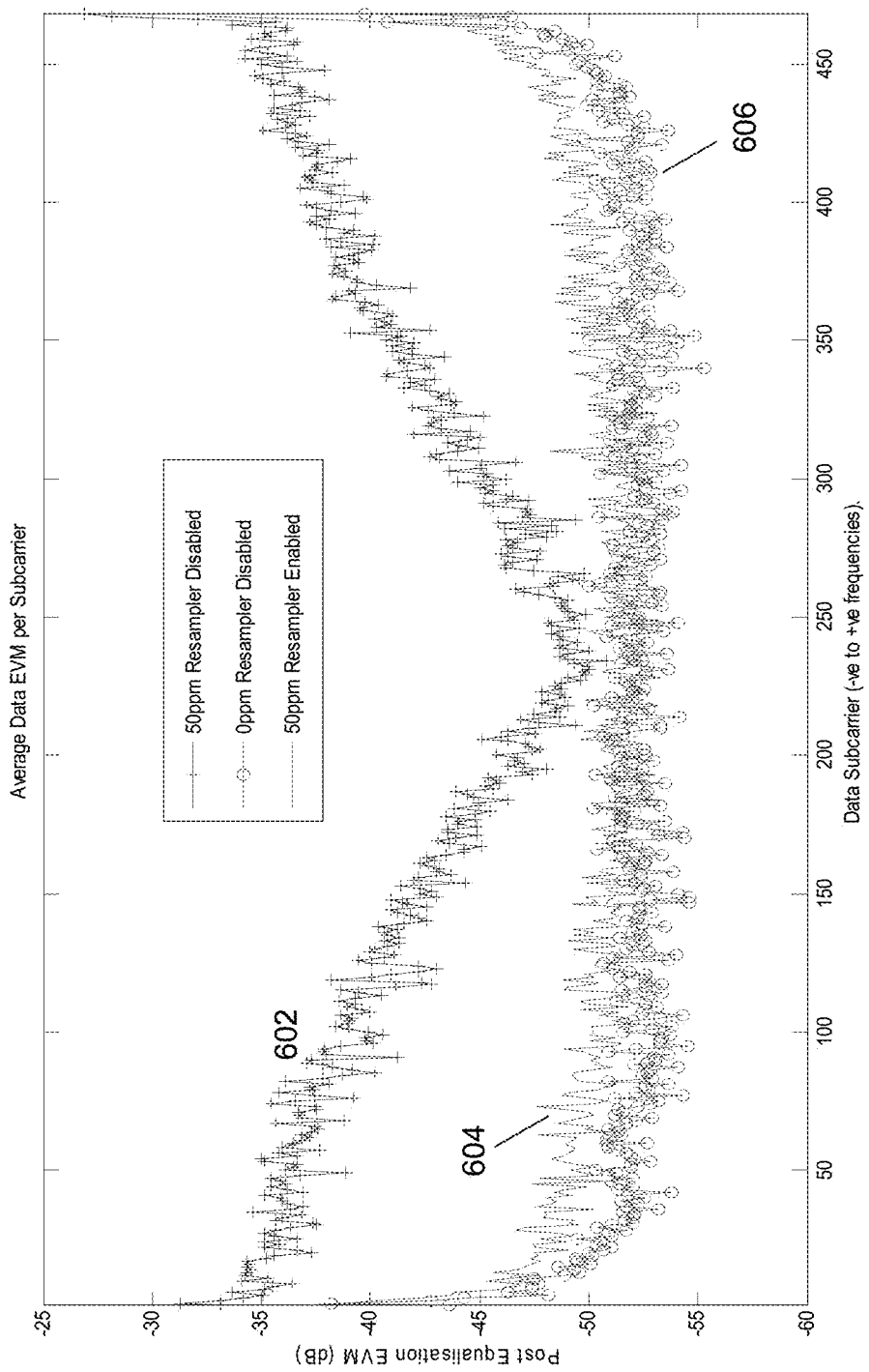
FIG. 6 is a graph illustrating reduction in effective noise floor due to SFO of 50 ppm that can be obtained using embodiments of the invention.

FIG. 6 illustrates experimental results of performing SFO correction according to embodiments of the invention. Note the improvement between the noise floor for a situation when 50 ppm SFO is present with resampling according to the invention disabled (represented by curve 602) and resampling enabled (represented by curve 604). For comparison, FIG. 6 also illustrates a situation where no SFO is present (represented by curve 606).

Although the present invention has been particularly described with reference to the preferred embodiments thereof, it should be readily apparent to those of ordinary skill in the art that changes and modifications in the form and details may be made without departing from the spirit and scope of the invention. It is intended that the appended claims encompass such changes and modifications.

The invention claimed is:

1. An apparatus comprising:
   an analog-to-digital converter configured to produce samples of a wireless signal;
   a time domain processing block configured to operate on the samples and determine a sampling time drift;
   a resampler configured to adjust the samples in accordance with the sampling time drift; and
   an FFT configured to transform the adjusted samples to a frequency domain representation of the wireless signal.

2. The apparatus of claim 1, wherein the resampler comprises a filter with a plurality of taps having corresponding coefficients.

3. The apparatus of claim 2, further comprising logic configured to determine the coefficients using the sampling time drift.

4. The apparatus of claim 3, further comprising a table including a plurality of sets of corresponding coefficients, each set associated with a value of the sampling time drift.

5. The apparatus of claim 1, wherein the time domain processing block is further configured to perform carrier frequency offset correction on the samples.

6. The apparatus of claim 1, further comprising a synchronization block configured to direct the resampler to operate on samples within a single data block.

7. The apparatus of claim 6, wherein the single data block corresponds to a data symbol.

8. The apparatus of claim 7, wherein the data symbol is an OFDM symbol.

9. The apparatus of claim 1, wherein the sampling time drift is less than 50 ppm.

10. A method comprising:
    obtaining samples of a wireless signal;
    operating on the samples to determine a sampling time drift;
    adjusting the samples in accordance with the sampling time drift; and
    transforming the adjusted samples to a frequency domain representation of the wireless signal.

11. The method of claim 10, wherein adjusting the samples includes filtering the samples with a plurality of taps having corresponding coefficients.

12. The method of claim 11, further comprising determining the corresponding coefficients using the sampling time drift.

13. The method of claim 12, further comprising selecting the corresponding coefficients from a plurality of sets of coefficients, each set associated with a value of the sampling time drift.

14. The method of claim 10, further comprising, before the adjusting, performing carrier frequency offset correction on the samples.

15. The method of claim 10, wherein adjusting the samples comprises operating on samples within a single data block.

16. The method of claim 15, wherein the single data block corresponds to a data symbol.

17. The method of claim 16, wherein the data symbol is an OFDM symbol.

18. The method of claim 10, wherein the sampling time drift is less than 50 ppm.

\* \* \* \* \*